United States Patent [19]

Morishita et al.

[11] Patent Number: 4,849,889

[45] Date of Patent: Jul. 18, 1989

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 44,055

[22] Filed: Apr. 29, 1987

[30] Foreign Application Priority Data

| Apr. 29, 1986 | [JP] | Japan | 61-100058 |
| Apr. 29, 1986 | [JP] | Japan | 61-100061 |
| May 27, 1986 | [JP] | Japan | 61-124012 |

[51] Int. Cl.⁴ .......................................... B62D 5/04
[52] U.S. Cl. .............................. 364/424.05; 180/142; 74/388 PS
[58] Field of Search ............... 364/424; 180/79.1, 142; 74/388 PS

[56] References Cited

U.S. PATENT DOCUMENTS

| 4,573,545 | 3/1986 | Kalns | 180/79.1 |
| 4,582,155 | 4/1986 | Ohe | 180/79.1 |
| 4,651,840 | 3/1987 | Shimizu et al. | 180/79.1 |
| 4,715,463 | 12/1987 | Shimizu | 180/79.1 |
| 4,730,686 | 3/1988 | Shimizu | 180/79.1 |
| 4,735,271 | 4/1988 | Shimizu | 180/79.1 |

FOREIGN PATENT DOCUMENTS

| 50-38229 | 4/1975 | Japan . |
| 57-22967 | 2/1982 | Japan . |
| 59-50864 | 3/1984 | Japan . |

*Primary Examiner*—Parshotam Lall
*Assistant Examiner*—Thomas G. Black
*Attorney, Agent, or Firm*—Leydig, Voit & Mayer

[57] ABSTRACT

A motor-driven power steering system for a vehicle having a motor operatively connected to the steerable road wheels of the vehicle and a clutch arrangement interposed therebetween for selectively establishing and interrupting the transmission of power-assisting force from the motor to the road wheels in accordance with vehicle speed and operator-induced steering torque resulting form the steering force exerted on the steering wheel. The current to be supplied to the motor for controlling the running operation thereof is gradually decreased to reduce the power-assisting force transmitted from the motor to the steerable road wheels as the vehicle speed increases before the clutch is switched off and gradually increased to increase the power-assisting forces as the vehicle speed decreases after the clutch is switched on so as to provide a smooth transition from power steering to manual steering or vice versa without causing any abrupt change in the steering torque.

13 Claims, 9 Drawing Sheets

MOTOR-DRIVEN POWER STEERING SYSTEM FOR A VEHICLE

BACKGROUND OF THE INVENTION

1. Field of the Invention

This invention relates to a motor-driven power steering system for a vehicle for assisting the operator-induced steering operation by means of the rotating force of a motor.

2. Description of the Prior Art

In a conventional power steering system as schematically illustrated in FIG. 1, a steering wheel 1 is operatively connected through a steering shaft 2 having an upper portion 2a and a lower portion 2b and a first rack and pinion gear $T_1$ including a first pinion 5 and a first rack tooth portion 6a with a steering rack 6 which is connected at its opposite ends with a pair of steerable road wheels (not shown) through a pair of tie rods 8a and 8b. When the steering wheel 1 is turned by an operator, the steerable road wheels (not shown) are appropriately steered in accordance with the steering motion of the steering wheel 1 exerted by the operator. The steering rack 6 is operatively connected with a motor 13 through a second rack and pinion gear $T_2$ including a second rack tooth portion 6b and a second pinion 17, a speed-reduction gear R, and a switching clutch 16 so that the driving force of the motor 13 is transmitted through the speed-reduction gear R, the switching clutch 16 and the second rack and pinion gear $T_2$ to the rack 6 to assist the steering operation of the steering wheel 1 by the operator. The motor 13 is electrically connected with a battery 11 through a control unit 9 and a key or ignition switch 12 so that it is energized by the battery 11 under the control of the control unit 9. The control unit 9 receives control signals from a steering-torque sensor 3 and a vehicle-speed sensor 10 to appropriately control the operation of the motor 13 and of the switching clutch 17 on the basis of the steering torque and the vehicle speed measured.

However, the power steering system as constructed above has the following problems. Specifically, when the travelling speed of the vehicle increases above or decreases below a prescribed level, the control unit 9 operates to deenergize or energize the switching clutch 17 to interrupt or establish the transmission of the assisting force from the motor 13 to the rack 6. The clutch switches the steering system into a manual steering mode without any power assist or into a power steering mode with power assist. Accordingly, whenever the vehicle speed changes across a prescribed speed level, the operating mode of the steering system abruptly changes from power steering into manual steering or vice versa, thus causing the operator to feel instability in the steering.

SUMMARY OF THE INVENTION

In view of the above, the present invention has the objective of overcoming the above-described problem of the prior art, and has for its main object the provision of a novel and improved motor-driven power steering system for a vehicle which can be switched or transferred from power steering into manual steering or vice versa in an extremely smooth manner without causing any abrupt change in steering torque and hence any unsure feelings on the part of the operator, and which can be incorporated in an existing motor-driven power steering system without incurring any substantial increase in manufacturing costs.

In order to achieve the above object, according to the present invention, there is provided a motor-driven power steering system for a vehicle having a steering wheel operatively connected to steer steerable road wheels in response to force exerted on by an operator the motor-driven power steering system comprising:

a torque sensor connected to detect operator-induced steering torque resulting from steering force exerted on to the steering wheel by the operator to generate an output signal representative thereof;

a vehicle-speed sensor for detecting vehicle speed to generate an output signal representative of the detected vehicle speed;

a motor operatively connected to the steerable road wheels and connected to be energized by a source of electric power for power to transmit a force to the steerable road wheels assisting steering motion caused by the operator through the steering wheel;

a clutch means connected to be switched off for interrupting the transmission of the power-assisting force from the motor toward the steerable road wheels when the vehicle speed increases above a prescribed level, and switched on for establishing the transmission of the power-steering force when the vehicle speed decreases below the prescribed level; and a control unit connected to receive output signals from the torque sensor and the vehicle-speed sensor for determining a current to be supplied to the motor and the clutch means so as to control respective running and switching operations of the motor and the clutch means in such a manner that the power-assisting force transmitted from the motor to the 'steerable road wheels is controlled in accordance with the travelling speed of the vehicle and the steering torque induced by the operator.

The current supplied from the source of electric power to the motor is gradually decreased to reduce the power-assisting force transmitted from the motor to the steerable road wheels as the vehicle speed increases before the clutch means is switched off, and gradually increased to increase the power-assisting force as the vehicle speed decreases after the clutch means is switched on.

In a preferred embodiment, the current supplied to the motor is increased or decreased in a stepwise fashion in accordance with the vehicle speed, and increased as the steering torque induced by the operator increases. The control unit comprises:

a steering-torque measuring means connected to receive the output signal from the torque sensor for measuring the operator-induced steering torque;

a vehicle-speed measuring means connected to receive the output signal from the vehicle-speed sensor for measuring the vehicle speed;

a first memory means for storing motor-current multipliers corresponding to varying vehicle speeds;

a second memory means for storing motor-current values corresponding to varying steering torque values;

a motor-current determining means connected to receive the output signals from the steering-torque measuring means and the vehicle-speed measuring means, for determining an appropriate motor-current multiplier corresponding to the measured vehicle speed and an appropriate motor-current value corresponding to the measured steering torque so as to calculate the current to be supplied to the motor by multiplying the motor-current value by the motor-current multiplier;

a motor-current controlling means for controlling the running operation of the motor in accordance with the calculated current from the motor-current determining means; and a clutch controlling means for controlling the switching operation of the clutch means in such a manner that the clutch means is switched off when the measured vehicle speed is above the prescribed level, and switched on when the measured vehicle speed is below the prescribed level.

The motor-current determining means determines whether or not the measured vehicle speed is less than the prescribed speed level, and the control unit includes means to control the respective running and switching operations of the motor and the clutch means in such a manner that calculated the current, as determined by the motor-current determining means is supplied to the motor and the clutch means is switched on, and when the measured vehicle speed is at least equal to the prescribed level, the current supplied to the motor is made to be zero and the clutch means is switched off.

The motor-current determining means further determines whether the calculated current, is greater than a prescribed offset current level, and the control means controls the respective running and switching operations of the motor and the clutch means in such a manner that when the calculated current is greater than the prescribed offset current level and the measured vehicle speed is less than the prescribed speed level, the calculated current is supplied to the motor and the clutch means is switched on, and when the calculated current is at most equal to the prescribed offset current level and the measured vehicle speed is less than the prescribed speed level, the current supplied to the motor is increased to the offset current level and the clutch means is switched on.

The control unit further comprises a steering-interruption judging means connected to determine whether steering operation is interrupted and generate an output signal to the motor-current determining means when it is determined that steering operation is interrupted.

The motor-current determining means further determines whether or not an absolute value of the measured steering torque is equal to or less than a prescribed reference value when the measured vehicle speed is at least equal to the prescribed speed level, and the control means controls the respective running and switching operations of the motor and the clutch means in such a manner that when the absolute value of the measured steering torque is greater than the prescribed reference value, the calculated current is supplied to the motor and the clutch means is switched on, and when the absolute value of the measured steering torque is at most equal to the prescribed reference value, the current supplied to the motor is made to be zero and the clutch means is switched off.

The control unit further comprises a steering-torque change-rate calculating means connected to calculate a rate of change per unit time of a steering torque on the basis of the presently measured steering torque value and a precedingly measured steering torque value, and generate an output signal representative of the calculated steering-torque change rate.

The motor-current determining means further determines whether or not the calculated steering-torque change rate is at most equal to a prescribed reference torque change rate when the absolute value of the measured steering torque is at most equal to the prescribed reference value, and control means controls the respective running and switching operations of the motor and the clutch means in such a manner that when the calculated steering-torque change rate is greater than the prescribed reference torque change rate, it is then determined whether or not the clutch means is switched off and if it is so, the current supplied to the motor is made to be zero, but if not, the calculated current is supplied to the motor, and when the calculated steering-torque change rate is at most equal to the prescribed reference torque change rate, the clutch means is switched off and the current supplied to the motor is made to be zero when the measured vehicle speed is at least equal to the prescribed speed level, but the clutch means is switched on and the calculated current is supplied to the motor when the measured vehicle speed is less than the prescribed speed level.

The above and other objects, features and advantages of the present invention will become apparent from the following detailed description of a few presently preferred embodiments of the invention when taken in conjunction with the accompanying drawings.

BRIEF DESCRIPTION OF THE DRAWINGS

FIGS. 2 through 6 relate to a motor-driven power steering system in accordance with one embodiment of the present invention, in which:

FIG. 2 is a block diagram showing a control unit and its related parts;

FIG. 3 is a graph showing a relationship between the motor current and the steering torque;

FIG. 4 is a graph showing a vehicle-speed/motor-current relationship and a vehicle-speed/clutch-voltage relationship;

FIG. 5 is a flow chart showing one control process of the power steering system of FIG. 1 as controlled by the control unit illustrated in FIG. 2;

FIG. 6 is another flow chart showing another control process of the power steering system of FIG. 1 as controlled by the control unit illustrated in FIG. 2;

Figure 1:
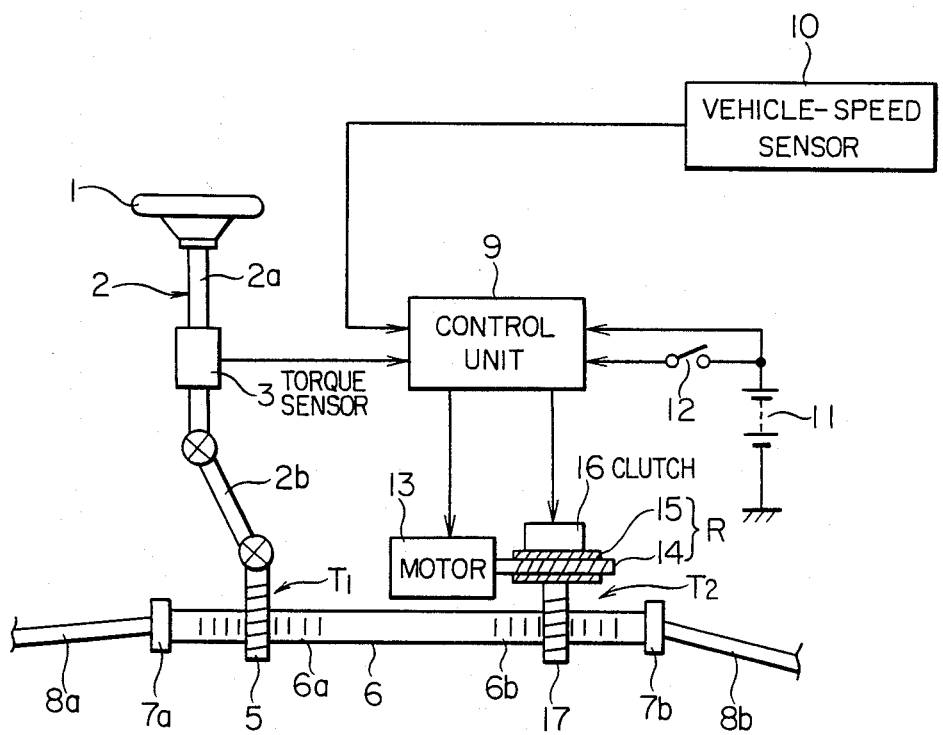
FIG. 1 is a schematic view illustrating a general arrangement of a motor-driven power steering system for a vehicle having a conventional control unit.

DESCRIPTION OF THE PREFERRED EMBODIMENTS the present invention will now be described in detail with reference to a few presently preferred embodiments thereof as illustrated in the accompanying drawings. In the following, the same parts or elements of the embodiments will be identified by the same reference numerals and characters as employed in FIG. 1.

Figure 2:
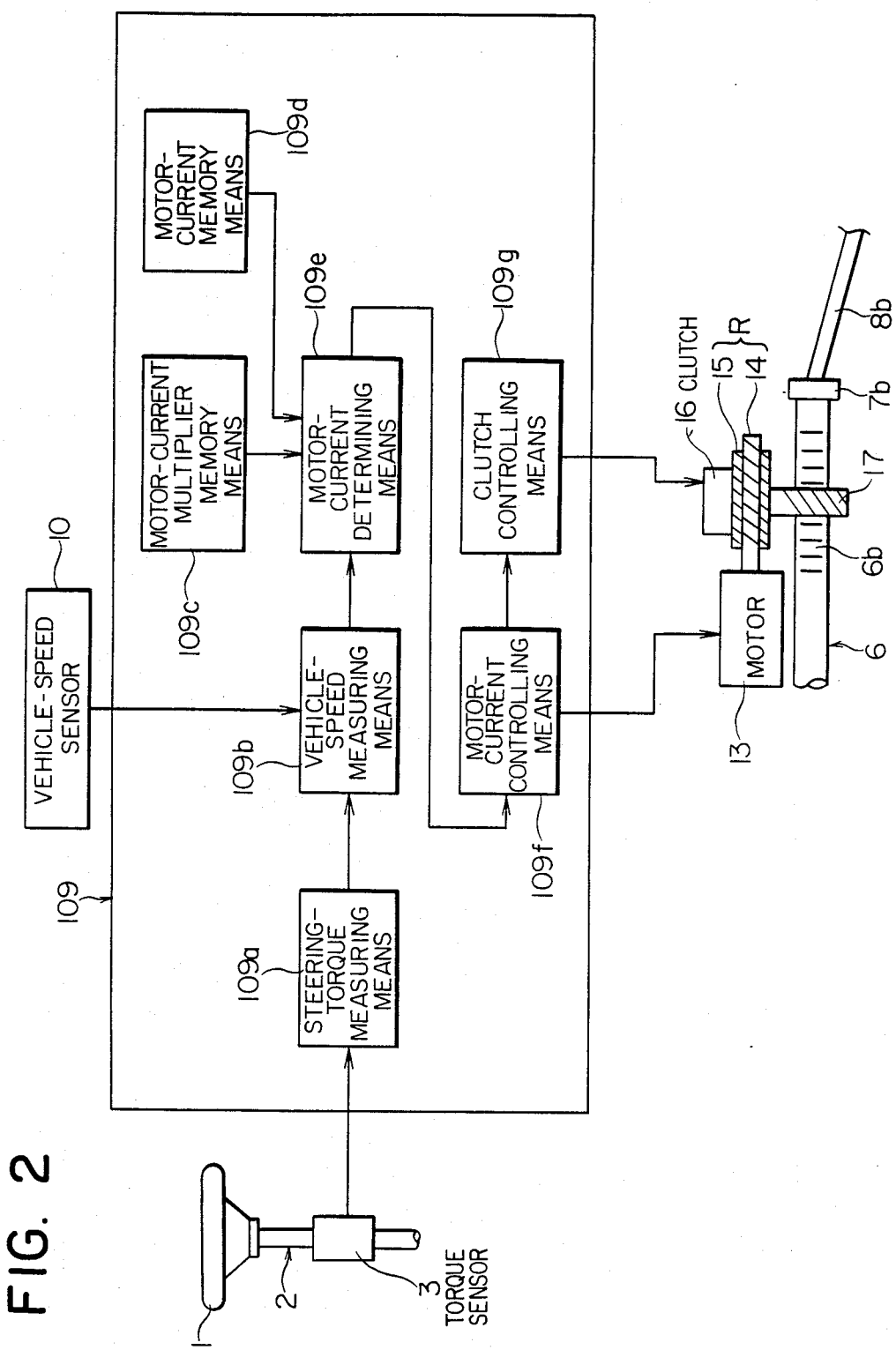

Referring to the drawings and first to FIG. 2, there is shown a control unit 109 constructed in accordance with one embodiment of the present invention for controlling the operation of the motor-driven power steering system illustrated in FIG. 1. As diagrammatically illustrated in FIG. 2, the control unit 109 receives output signals from a torque sensor 3 and from a vehicle-speed sensor 10 for controlling the operation of a motor 13 and a clutch means 16 an electromagnetic switching of clutch. The power-assisting force transmitted from the motor 13 to the steerable road wheels (not shown) is controlled in accordance with the travelling speed of a vehicle and the steering torque applied by the operator.

The control unit 109 controls the electromagnetic switching clutch 16 in such a manner that the clutch 16 is switched off when the vehicle speed increases above a prescribed level, and switched on for transmission of the power-steering force when the vehicle speed decreases below the prescribed level. The control unit 109 also controls the motor 13 in such a manner that the power-assisting force generated by the motor 13 is gradually decreased as the vehicle speed increases. To this end, the current supplied from a power source such as a battery (not shown) to the motor 13 is gradually decreased as the vehicle speed increases before the clutch 16 is switched off, and gradually increased as the vehicle speed decreases after the clutch 16 is switched on. Also, the current supplied to the motor 13 is increased as the steering torque applied by the operator increases.

As shown in FIG. 2, the control unit 109 comprises: a steering-torque measuring means 109a receiving the output signal of the torque sensor 3 for measuring the operator-induced steering torque; a vehicle-speed measuring means 109b receiving the output signal of the vehicle-speed sensor 10 for measuring the travelling speed of the vehicle; a first memory means 109c in the form of a motor-current multiplier memory means for storing motor-current multipliers which correspond to varying vehicle speeds; a second memory means 109d in the form of a motor-current memory means for storing motor-current values which correspond to varying steering torque values; a motor-current determining means 109e connected to receive the output signals from the steering-torque measuring means and the vehicle-speed measuring means for determining an appropriate motor-current multiplier which corresponds to the measured vehicle speed and an appropriate motor-current value which corresponds to the measured steering torque to calculate the current to be supplied to the motor 13 by multiplying the motor-current value by the motor-current multiplier; a motor-current controlling means 109f for controlling the running operation of the motor 13 in accordance with the calculated current from the motor-current determining means 109e; and a clutch controlling means 109g for controlling the switching operation of the electromagnetic switching clutch 16 in such a manner that the clutch 16 is switched off when the measured vehicle speed is above a prescribed level, and switched on when the measured vehicle speed is below the prescribed level.

Figure 3:
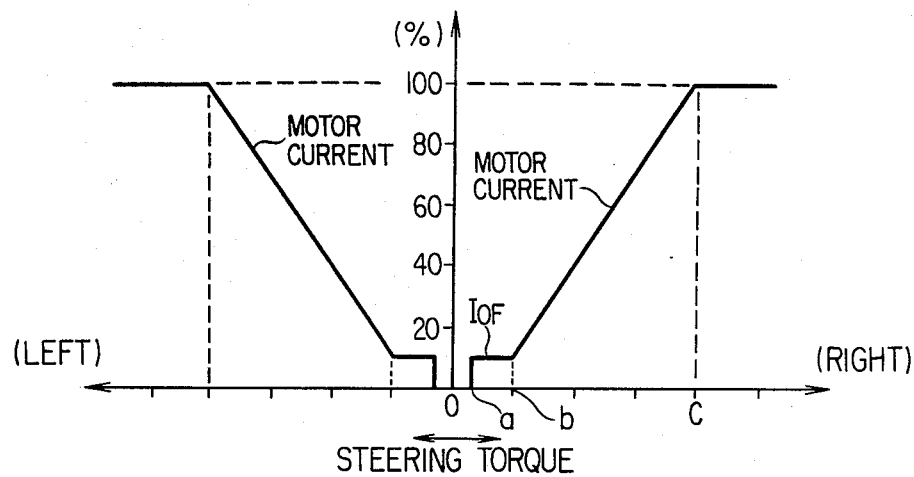

Now, the operation of the above-described control unit 109 will be described in detail with reference to FIGS. 3 through 6. First, the case in which a vehicle is stationary or standing still will be considered. In this case, when a key or ignition switch (not shown) is first turned on to start the engine, the electromagnetic switching clutch 16 is automatically actuated to place the second pinion 17 into mechanical coupling with the worm wheel 15. In this state, when the steering wheel 1 is turned by an operator, the control unit 109 acts to control the operation of the motor 13, a DC motor in the manner as illustrated in FIG. 3. More specifically, when steering torque increases in the righthand direction to point a in FIG. 3, the motor 13 is turned on and supplied with an offset current of a certain low level $I_{OF}$ (for example, about 2 to 10 amperes) in order to alleviate the inertia of the motor 13 and the mechanical portions. As the steering torque further increases, the current supplied to the motor 13 begins to increase, at point b, linearly in direct proportion to the intensity of steering torque, and reaches 100% current at point c. On the other hand, as the steering torque decreases, current flowing through the motor 13 begins to decrease at point c and becomes to be the offset level $I_{OF}$ at point b. When the steering torque further decreases and reaches point a, the current supply to the motor 13 is reduced to zero and the motor 13 is stopped. Similar to this, the motor 13 is controlled in the same manner when the steering torque increases or decreases in the lefthand direction. In this connection, it is to be noted that the power-assisting force generated by the motor 13 is in direct proportion to the current supplied thereto.

Accordingly, as pictured in FIG. 3, as the steering torque increases, the motor 13 is energized or turned on at point a and supplied with the offset current $I_{OF}$. As the steering torque further increases, the current supplied to the motor 13 is gradually increased at point b so that the output torque of the motor 13 to be transmitted to the worm 14 accordingly increases gradually. As a result, an assisting force having an intensity corresponding to the operator's steering effort applied to the steering wheel 1 is transmitted to the second rack tooth portion 6b on the steering rack 6 through the worm wheel 15, the electromagnetic switching clutch 16 and the second pinion 17, thereby lightening the steering operation for the operator.

Now, the case in which the vehicle is travelling will be considered. In this case, as seen from FIG. 4, the control unit 109 controls the operation of the motor 13 by controlling the current supplied to the motor 13 on the basis of the steering torque applied by the operator and the travelling speed of the vehicle. The motor current is calculated by multiplying an appropriate motor-current value $I_{M1}$ which corresponds to the measured steering torque $T_S$ by an appropriate motor-current multiplier $K_I$ which corresponds to the measured vehicle speed V. More specifically, as illustrated in the flow chart of FIG. 5, the control unit 109 is initialized after the key or ignition switch is turned on, and then, at step S1, the output of the vehicle-speed sensor 10 is input to the vehicle-speed measuring means 109b to measure the travelling speed V of the vehicle. At step S2, the steering-torque measuring means 9a measures the steering torque $T_S$ applied by the operator, and the motor-voltage determining means 109e reads out from the motor-current multiplier memory means 109c an appropriate motor-current multiplier $K_I$ corresponding to the measured vehicle speed V at step S3, and also reads out from the motor-current memory means 109d an appropriate motor current value $I_{M1}$ corresponding to the measured steering torque $T_S$ at step S4.

Subsequently, at step S5, the motor-current determining means 109e calculates an appropriate motor current value $I_M$ to be supplied to the motor 13 by multiplying the read-out motor current value $I_{M1}$ by the read-out motor-current multiplier $K_I$.

Figure 4:
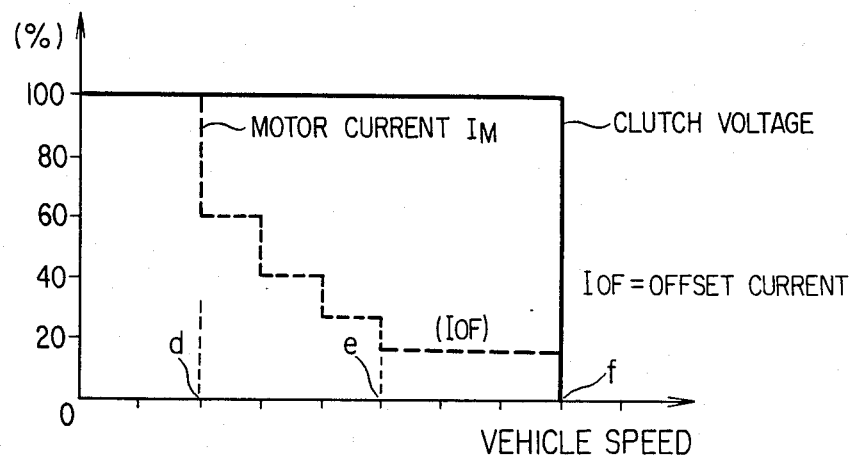

The above motor-current multiplier $K_I$ is set to be 100% until the vehicle speed increases above a certain level at point d in FIG. 4; decreased in a stepwise fashion as the vehicle speed further increases from point d; and held constant in order to alleviate the inertia influence from the mechanical portions of the power steering system after the vehicle speed further increases from point e. If, at step S6, it is judged that the vehicle speed V is less than a predetermined level $V_2$, the current $I_M$ calculated in the above manner is supplied to the motor 13 under the control of the motor-current controlling means 109f at step S7, and at step 8, the clutch controlling means 109g acts to actuate or switch on the electromagnetic switching clutch 16 thereby to mechanically connect the motor 13 with the steering rack 6 via the speed-reduction gear R, the electromagnetic switching clutch 16, the pinion 17 and the second rack tooth portion 6b.

Figure 5:
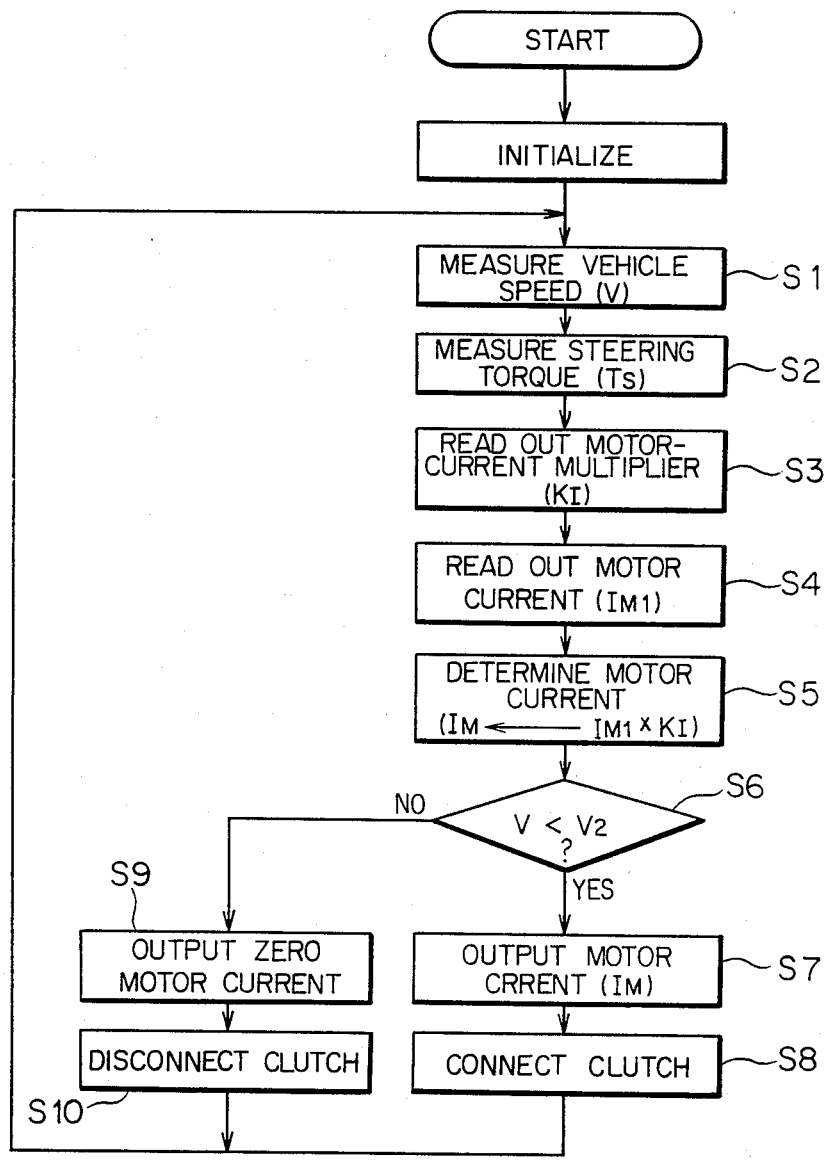

Thereafter, when the vehicle speed V increases and reaches point f, as shown in FIG. 4, the current supplied to the motor 13 is made to be zero at step S9 in FIG. 5, and the electromagnetic switching clutch 16 is deenergized or disconnected at step S10 in FIG. 5 so that the mechanical connection between the worm wheel 15 and the second pinion 17 is released, thus making the steering system into a non-power assisted manual steering mode.

Figure 6:
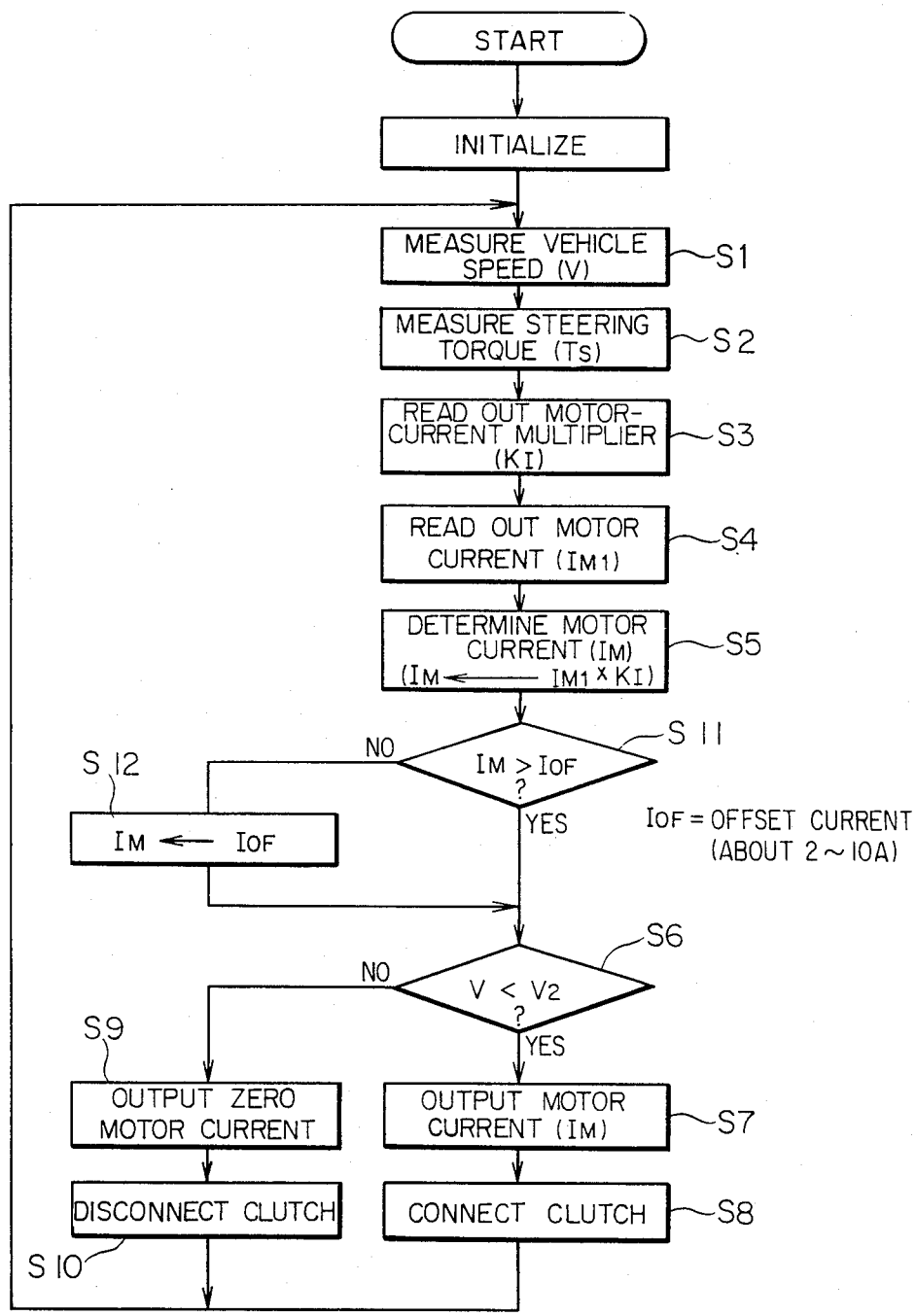

FIG. 6 shows a modified form of control process carried out by the control unit 109 illustrated in FIG. 2. According to this modification, as shown in FIG. 6, after step 5, it is determined at step S11 whether or not the motor current $I_M$ is greater than the prescribed offset current $I_{OF}$ (for example, about 2 to 10 amperes) during travel of the vehicle, and if it is so, the control process proceeds from step S5 to step S6 through step S11. On the other hand, if it is determined that the motor current $I_M$ is at most equal to the offset current $I_{OF}$ at step S11, the motor current $I_M$ is changed to and replaced by the offset current $I_{OF}$ at step S12, and then the control process proceeds to step S6. Thereafter the same process steps as those S7 through S10 in FIG. 5 are carried out.

In this manner, when the vehicle speed is increasing above the prescribed level $V_2$, the current supplied to the motor 13 is gradually decreased to the prescribed offset level $I_{OF}$. Accordingly, power-assisting force transmitted from the motor 13 to the steering rack 6 is reduced to a sufficiently small level before the electromagnetic switching clutch 16 is switched off or disconnected. On the other hand, when the vehicle speed V is decreasing below the prescribed level $V_2$, the clutch 16 is first switched on or connected with the motor deenergized, and then the motor current is gradually increased so that the power-assisting force transmitted to the steering rack 6 gradually increases. As a result, there will be no great shock generated due to disconnection or connection of the clutch 16, thus enabling smooth transfer of the steering system from a power steering mode to a manual steering mode or vice versa without causing any abrupt, unsure, or unstable feeling on the part of the operator.

Figure 7:
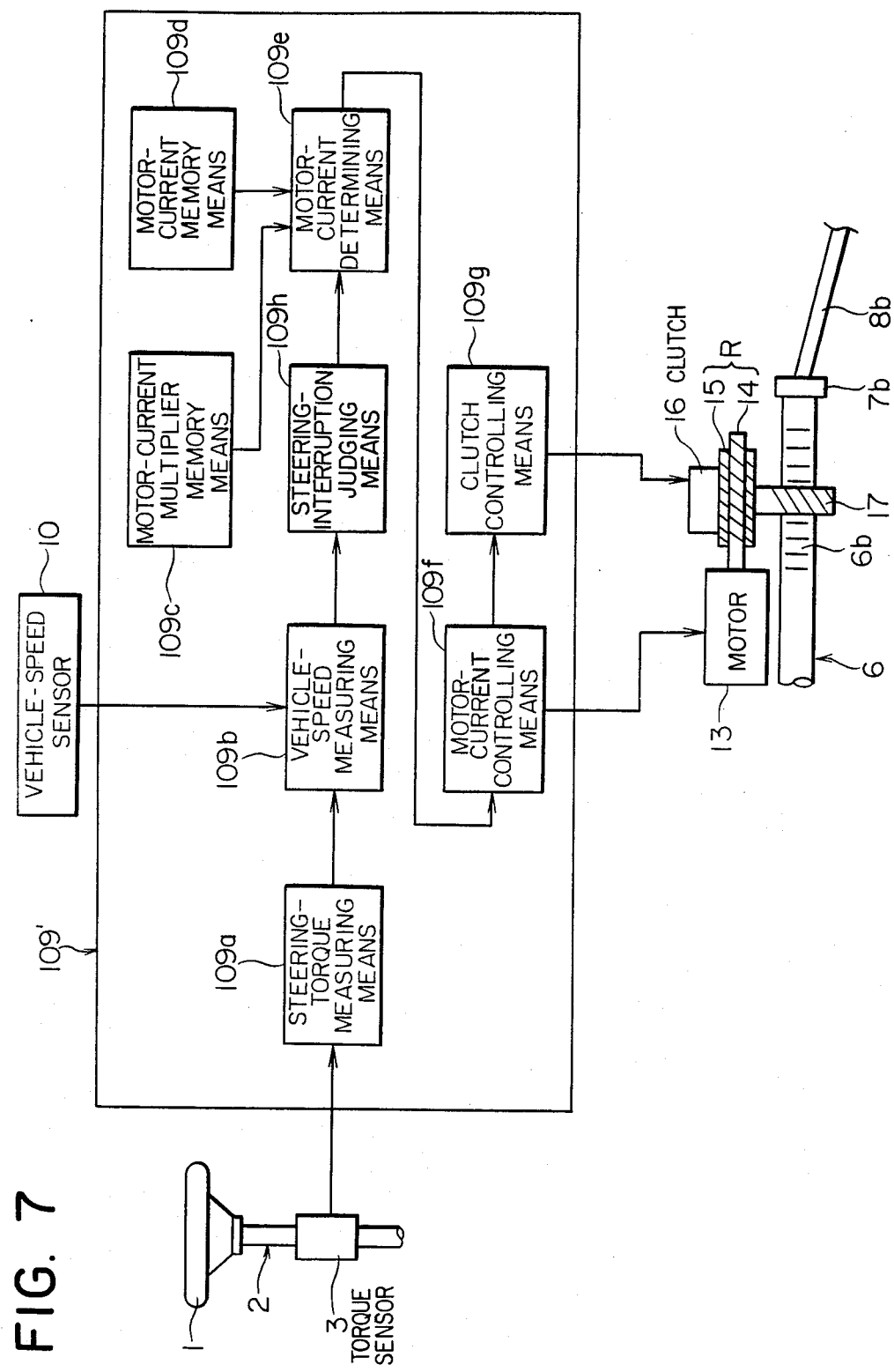
FIG. 7 is a block diagram showing a control unit and its related parts in accordance with another embodiment of the present invention.
Figure 8:
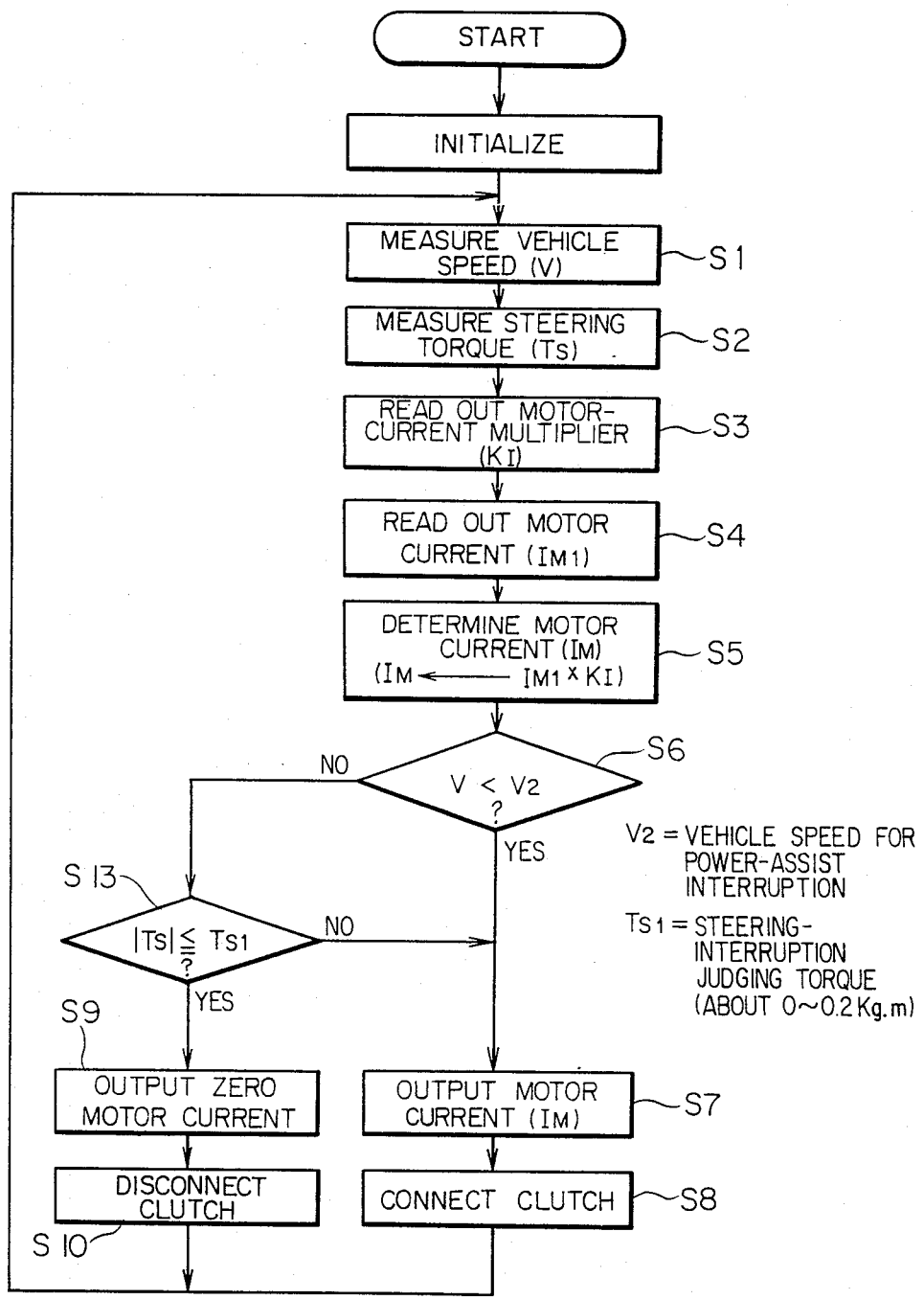
FIG. 8 is a flow chart showing the control process of the power steering system of FIG. 1 as controlled by the control unit of FIG. 7.

FIGS. 7 and 8 show a modified form of control unit in accordance with the present invention. This control unit 109' is similar to the first mentioned embodiment as illustrated in FIG. 2 except for the provision of a steering-interruption judging means 109h which serves to determine whether or not the steering operation is interrupted or stopped. The steering-interruption judging means 109h generates an output signal if it is determined that the steering operation is interrupted or stopped. To this end, the steering torque $T_S$ measured by the steering-torque measuring means 109a is compared with a prescribed reference value $T_{S1}$. If the absolute value of the measured steering torque $|T_S|$ is at most equal to the prescribed reference value $T_{S1}$, the steering-interruption judging means 109h determines that the steering operation is interrupted. In this embodiment, the motor-current determining means 109e receives the output signal from the steering-interruption judging means 109h as well as the output signals from the motor-current multiplier memory means 109c and the motor-current memory means 109d. Means 109e controls the current supplied to the motor 13 by multiplying an appropriate output from the motor-current memory means 109d by an appropriate output of the motor-current multiplier memory means 109c if the steering-interruption judging means 109h determines that the steering operation is not interrupted. On the other hand, the motor current is zero if the steering-interruption judging means 109h determines that the steering operation is interrupted.

In the operation of this embodiment, as shown in the flow chart of FIG. 8, the same operational processes as those in the flow chart of FIG. 6 are carried out from steps S1 through S5. The motor current $I_M$ is calculated at step S5 by multiplying the motor current $I_{M1}$, which is read out from the motor-current memory means 109d and corresponds to the measured steering torque $T_S$, by an appropriate multiplier $K_I$, which is read out from the motor-current multiplier memory means 109c and corresponds to the measured vehicle speed V. It is determined at step S6 whether or not the measured vehicle speed V is less than the prescribed reference level $V_2$. If it is determined that the vehicle speed V is less than the prescribed reference level $V_2$, the motor current $I_M$ calculated at step S5 is output to the motor 13 by the motor-current controlling means 109f at step S7 and the electromagnetic switching clutch 16 is switched on or connected by the clutch controlling means 109g at step S8. On the other hand, if the steering-interruption judging means 109h determines that the vehicle speed V is equal to or greater than the prescribed reference level $V_2$, it is then determined at step S13 whether or not the absolute value of the measured steering torque $|T_S|$ is equal to or less than a prescribed steering-interruption reference level $T_{S1}$ (about 0 to 0.2 Kg.m). If $|T_S|$ is no more than $T_{S1}$, the motor current output is made zero by the motor-current controlling means 109f at step S9. At the same time the electromagnetic switching clutch 16 is switched off or disconnected by the clutch controlling means 109g at step S10. At step S13, if it is determined that the absolute value of the measured steering torque $|T_S|$ is greater than the steering-interruption reference torque $T_{S1}$, the motor current $I_M$ as calculated at step S5 is output to the motor 13 by the motor-current controlling means 109f and the electromagnetic switching clutch 16 is switched on or connected.

According to this modification, even when the vehicle speed V is increasing toward the prescribed reference level $V_2$, the clutch 16 is held switched on or connected and the motor 13 is supplied with the current $I_M$ calculated at step S5 if the absolute value of the measured steering torque $|T_S|$ is greater than the steering-interruption judging torque $T_{S1}$. The power-assisting force is not interrupted but transmitted from the motor 13 to the steering rack 16 to maintain the power-steering operation of the steering system. In other words, where the vehicle speed V exceeds the prescribed level $V_2$, the power assist is interrupted only when the steering torque $T_S$ induced by the operator is limited or negligible, thereby preventing the power assist from being interrupted during the steering operation.

In this modification, however, if the rate of change of the steering torque is large, a large shock may develop and be transmitted to the steering wheel 1 due to a time lag in operation upon the switching off of the electromagnetic switching clutch 16. The steering torque may become large at the time when the clutch 16 is actually switched off.

Figure 9:
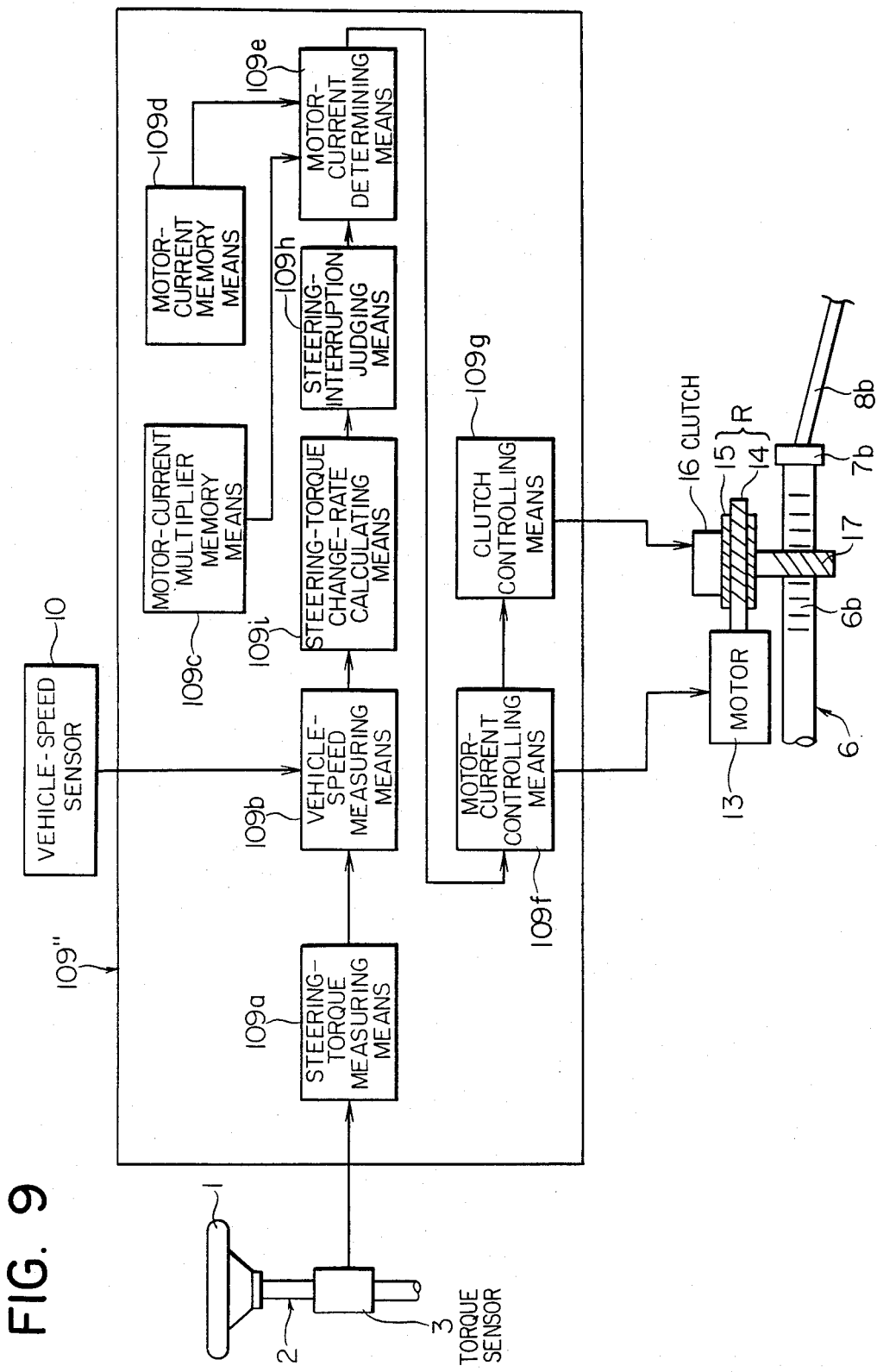
FIG. 9 is a block diagram showing a control unit and its related parts in accordance with a further embodiment of the present invention.
Figure 10:
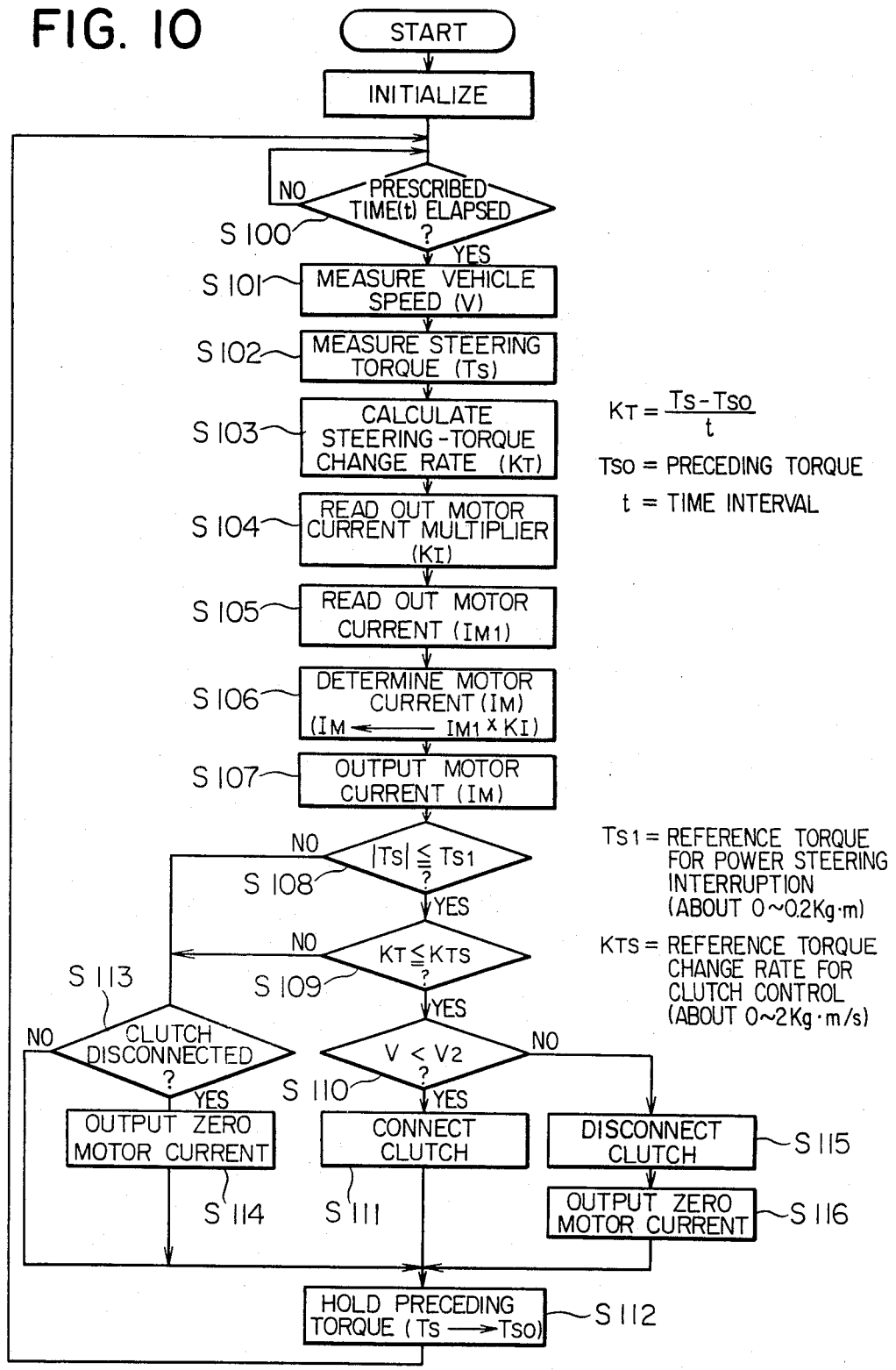
FIG. 10 is a flow chart showing the control process of the power steering system of FIG. 1 as controlled by the control unit of FIG. 9.

FIGS. 9 and 10 show a further modification of a control unit in accordance with the present invention which can solve the above-mentioned problem. This modified control unit 109" is similar to the above-mentioned modified embodiment as illustrated in FIG. 7 except for the provision of a steering-torque change-rate calculating means 109i which serves to calculate the rate of change of the steering torque $K_T$ by dividing the difference between a presently measured steering torque $T_S$ and an earlier measured steering torque $T_{S0}$ by the time interval t therebetween. The rate of change of the steering torque $K_T$ thus calculated is input to the steering-interruption judging means 109h wherein it is compared with a prescribed reference value $K_{TS}$. The steering-interruption judging means 109h determines whether the steering operation is interrupted or not effected. If the absolute value of the measured steering torque $|T_S|$ is equal to or less than the prescribed reference torque $T_{S1}$ and if the rate of change of the steering torque $K_T$ is equal to or less than the prescribed reference value $K_{TS}$, means 109h generates an output signal if it is determined that the steering operation is interrupted.

In operation of this modification, as illustrated in the flow chart of FIG. 10, after initialization, it is determined whether or not a predetermined period of time t has elapsed at step S100, and if it has, the same operational steps S101, S102 and S104 through S106 as those S1 through S5 of FIG. 8 are carried out. At step S103, the rate of change of the steering torque $K_T$ is calculated by dividing the difference between the presently measured steering torque $T_S$ and an earlier measured steering torque $T_{S0}$ by the time interval t therebetween. At step S107, the motor current $I_M$, which is determined by the motor-current determining means 109 in the same manner as in the embodiment of FIG. 2 or FIG. 8, is output to the motor 13. In this modification, however, the operations of the motor 13 and the electromagnetic switching clutch 16 are further controlled in the following manner. Specifically, at step S108, it is determined whether or not the absolute value of the measured steering torque $|T_S|$ is equal to or less than the prescribed reference value $T_{S1}$ (about 0 to 0.2Kg.m), that is whether or not the steering operation is interrupted. If so, it is then judged at step S109 whether or not the change rate of the steering torque $K_T$ as calculated at step S103 is equal to or less than the prescribed reference value $K_{TS}$ (about 0 to 2Kg.m), that is whether or not the steering torque is, changing gradually or slowly. If it is so, at step S110, determined whether or not the vehicle speed V as measured at step S101 is less than the prescribed reference level $V_2$. If so, there is no need to interrupt the power steering operation, and hence at step S111, the electromagnetic switching clutch 16 is switched on or connected by the clutch controlling means 109g, and the current calculated at step S106 is supplied to the motor 13. Thereafter, at step S112, the presently measured torque value $T_S$ is stored as the preceding torque value $T_{S0}$ by the motor-current memory means 109d for the next operation, and the control process returns from step S112 to step S100.

On the other hand, at step S110, if it is determined that the measured vehicle speed V is equal to or greater than the prescribed reference level $V_2$, the electromagnetic switching clutch 16 is switched off or disconnected by the clutch controlling means 109g at step S115, and the motor-current output is made zero by the motor-current controlling means 109f at step S116. In this case, when the electromagnetic switching clutch 16 is switched off, there will be no great shock generated even if there is a time lag between the measurement of the steering torque and the switching off of the electromagnetic switching clutch 16 because both the steering torque and the change rate of the steering torque are limited so that the steering torque will not become great in a short time. Thereafter, the control process proceeds to step S112, and the above-described operational steps are repeated.

Also, at step S108, if it is determined that the absolute value of the measured steering torque $|T_S|$ is greater than the prescribed reference value $T_{S1}$, or at step S109, if it is determined that the steering-torque change rate $K_T$ is greater than the prescribed reference value $K_{TS}$, it is then determined whether or not the electromagnetic switching clutch 16 is switched off or disconnected, and if not, the control process returns to step S100 through step S112. In this case, the current calculated from the motor-current value $I_{M1}$ and the motor-current multiplier $K_f$ at step S106 is supplied to the motor 13. At step S113, however, if it is determined that the electromagnetic switching clutch 16 is switched off or disconnected, the motor-current output is made zero by the motor-current controlling means 109f at step S114, and the control process proceeds to step S112.

What is claimed is:

1. A power steering system for a vehicle having a steering wheel for steering road wheels in response to a torque applied to the steering wheel by an operator comprising:
   steering torque sensing means for sensing the torque applied to a steering wheel of a vehicle by an operator and for generating a steering torque signal indicative of the steering torque applied;
   vehicle speed sensing means for sensing the speed of said vehicle and for generating a vehicle speed signal indicative of the vehicle speed;
   a motor for applying a power-assisting force to steerable road wheels of said vehicle assisting the torque applied to the steering wheel by an operator;
   clutch means for engaging and disengaging said motor with said steerable road wheels;
   first memory means for storing motor current multipliers, each motor current multiplier corresponding to one or more vehicles speeds;
   second memory means for storing motor current values, each motor current value corresponding to one or more steering torques; and
   control means, receiving said steering torque and vehicle speed signals and connected to said first and second memory means, for controlling the current supplied to said motor, for controlling the engagement and disengagement of said clutch means in response to vehicle speed signals indicating a vehicle speed relative to a prescribed threshold speed, for obtaining a motor current multiplier from said first memory means corresponding to the vehicle speed indicated by said vehicle speed signal and a motor current value from said second memory means corresponding to the steering torque indicated by said steering torque signal, for calculating the product of the motor current multiplier and the motor current value obtained from said first and second memory means, and for supplying a current corresponding to said product to said motor.

2. The power steering system according to claim 1 wherein the control means, when said clutch is engaged, gradually decreases the current supplied to said motor to reduce the power-assisting force in response to an increase in vehicle speed indicated by said vehicle speed signal, and gradually increases the current supplied to increase the power-assisting force in response to a decrease in vehicle speed indicated by said vehicle speed signal.

3. The power steering system according to claim 2 wherein the control means increases or decreases the current supplied to said motor in a stepwise fashion.

4. The power steering system according to claim 3 wherein the control means increases the current supplied to said motor in response to an increase in steering torque indicated by said steering torque signal.

5. The power steering system according to claim 4 wherein the control means changes the current supplied to said motor substantially in direct proportion to the steering torque indicated by said steering torque signal.

6. The power steering system according to claim 1 wherein said control means supplies said current corresponding to said product to said motor and engages said clutch means when the vehicle speed indicated by said vehicle speed signal is less than the threshold speed and wherein the control means supplies no current to said motor and disengages said clutch means when the vehicle speed indicated by said vehicle speed signal is at least equal to the threshold speed.

7. The power steering system according to claim 6 wherein said control means comprises a steering-interruption determining means for determining whether steering is interrupted and for generating a steering interruption signal supplied to said control means when steering is interrupted.

8. The power steering system according to claim 6 wherein control means compares the current corresponding to said product ot a prescribed offset current and (i) when the current corresponding to said product is greater than the prescribed offset current and the vehicle speed indicated by the vehicle speed signal is less than the threshold speed supplies the current corresponding to said product to said motor and engages said clutch means and (ii) when the current corresponding to said product is at most equal to the prescribed offset current and the vehicle speed indicated by the vehicle speed signal is less than the threshold speed, supplies a current to said motor equal to the prescribed offset current and engages said clutch means.

9. The power steering system according to claim 1 wherein said control means compares the absolute value of the steering torque indicated by the steering torque signal to a prescribed torque value when the vehicle speed indicated by said vehicle speed signal is at least equal to the threshold speed and wherein, when said comparison is made, said control means (i) when the absolute value of the steering torque indicated by said steering torque signal is greater than the prescribed torque value, supplies the current corresponding to said product to said motor and engages said clutch means, and (ii) when the absolute value of the steering torque indicated by the steering torque signal is at most equal to the prescribed torque value, supplies no current to said motor and disengages said clutch means.

10. The power steering system according to claim 9 wherein the control means, when the vehicle speed indicated by said vehicle speed signal is less than the threshold speed, supplies the current corresponding to said product to said motor and engages said clutch means.

11. The power steering system according to claim 1 wherein said control means further comprises a steering-torque change-rate calculating means for calculating the rate of change per unit time of the steering torque and for generating an output signal representative of the calculated steering-torque change rate.

12. The power steering system according to claim 11 wherein said control means compares the calculated steering-torque change rate to a prescribed reference torque change rate when the absolute value of the steering torque indicated by the steering torque signal is at most equal to the prescribed torque value, and wherein, when said comparison is made, said control means (i) when the calculated steering-torque change rate is greater than the prescribed reference torque change rate and said clutch means is disengaged, supplies no current to said motor, but when said clutch means is engaged, supplies a current corresponding to said product ot said motor, and (ii) when the calculated steering-torque change rate is at most equal to the prescribed reference torque change rate and the vehicle speed indicated by said vehicle speed signal is at least equal to the threshold speed, supplies no current to said motor and disengages said clutch means, but when the vehicle speed indicated by said vehicle speed signal is less than the threshold speed, supplies a current corresponding to said product to said motor and engages said clutch.

13. The power steering system according to claim 12 wherein said control means, when the absolute value of the steering torque indicated by the steering torque signal is less than the prescribed torque value and said clutch means is disengaged, supplies no current ot said motor, but if said clutch means is engaged, supplies a current corresponding to said product to said motor.

* * * * *